Nov. 21, 1950   F. K. CHANDLER   2,530,597
CULTURING APPARATUS
Filed March 9, 1945

INVENTOR.
Fred K. Chandler.
BY Bair & Freeman
Atty's.

Patented Nov. 21, 1950

2,530,597

UNITED STATES PATENT OFFICE 2,530,597

CULTURING APPARATUS

Fred K. Chandler, Des Moines, Iowa; F. Opal Chandler, executrix of said Fred K. Chandler, deceased, assignor to The Tanvilac Company, Inc., Des Moines, Iowa, a corporation of Iowa Application March 9, 1945, Serial No. 581,911

2 Claims. (Cl. 119—51)

My present invention relates to an apparatus for culturing drinking water for stock in accordance with the process herein disclosed.

One object of the invention is to provide a comparatively simple apparatus that is inexpensive to manufacture and which automatically supplies a culturing agent to the water without any attention other than periodic replenishment of the culturing agent and occasional cleaning out of the watering trough.

Another object is to provide means for heating the water to culturing temperature, and in one form of the apparatus to provide an automatic regulating means for the heat supplied to the water.

In connection with the process involved, the culturing agent is in the nature of a microbiological culture which may be conveniently produced at a plant or factory and suspended in a cereal medium which acts as a food for further development of the culturing agent at the feeding lot. In the present invention this development process is performed in connection with the drinking water for the animals or poultry. The culturing agent is not designed as a finished feed for the animals but is intended to be further cultivated by the farmer or feeder before being actually fed to the animals.

The advantages of this method are obvious: (1) Costs are less than they would be if the product were shipped as a finished feed because the culturing agent is dry. (2) Cultivation or development on the feeding lot produces a fresh feed at the time of consumption which possesses a fresh attractive flavor. Dried feeds do not have this quality unless fortified with flavoring agents. (3) Protein of higher biological value is formed by the activity of the culturing agent than that which is found naturally in the cereal grains. Substantial quantities of riboflavin and other members of the vitamin B complex group are created without opportunity of oxidative loss which would arise during shipment of the dry culture. Also substantial quantities of lactic acid or other organic acids which are healthful and nutritious are produced.

The cultivation of the culturing agent on the feeding lot is promoted and controlled by the apparatus herein disclosed and this apparatus is designed to maintain a temperature best suited to the growth and multiplication of the culture.

The culturing agent contains food materials which become available to the micro-organisms when the agent is mixed with water and the mixture is maintained at a temperature which is optimum for culture development.

In accordance with this invention I provide an apparatus which exploits the above outlined process to the best advantage and produces the desired results and with the foregoing as well as other objects in view my invention consists in a method of cultivating a culturing agent in the drinking water for animals and in the construction, arrangement and combination of the parts of an apparatus for performing the process whereby the objects contemplated are attained in the manner more fully set forth in the following specification, illustrated on the accompanying drawing and pointed out in my claims. With respect to the drawing:

Figure 1:
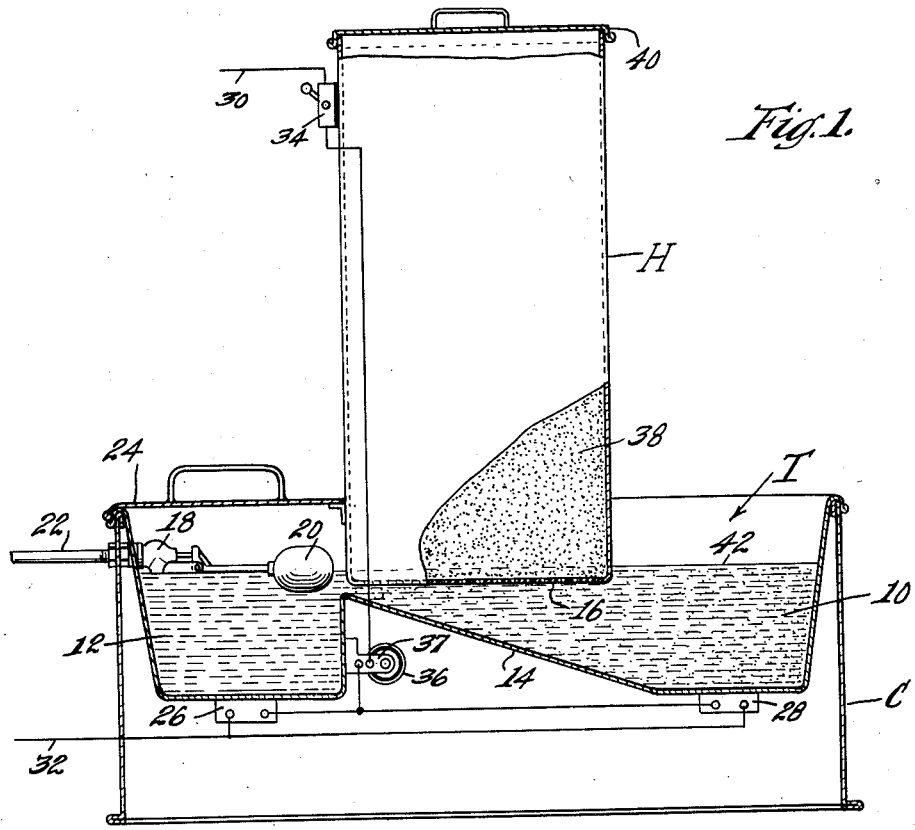
Figure 1 is a vertical, sectional view through an apparatus embodying my invention and showing an automatic electrically heated arrangement therefor, together with the wiring circuit for the heater and a thermostat to control it.

On the accompanying drawing I have used the reference numeral C to indicate a casing and T a water trough. A hopper H for culturing agent is provided, the trough T being suspended in the casing C and the hopper H suitably mounted on the trough.

The trough T has one end indicated at 10 to serve as a portion from which the animals such as cattle, hogs and/or poultry may drink. The other end has a float compartment 12 and between the two compartments there is an inclined bottom wall 14. The hopper H has a perforated bottom indicated at 16.

Within the float compartment 12 is a float valve 18, the float of which is indicated at 20. A water supply pipe 22 leads to the float valve either from a water main if available, or from a barrel or the like where running water is not available. The barrel would be set high enough that there would be gravity feed of water to the valve 18. The float compartment 12 is covered by a removable lid 24 for gaining access to the float for adjusting it or for repairing or replacing the valve.

In Figure 1 I show a pair of electric heaters 26 and 28. These may be of the encased strip type and fed with current from current supply wires 30 and 32. The current may be controlled by a switch 34 and a thermostat 36, the switch 34 being for manually shutting off the heaters, and the thermostat 36 being for automatically maintaining a predetermined temperature in the trough T. The best location for the thermostat I have found to be adjacent the hopper H.

The hopper H is adapted to contain the culturing agent comprising a cereal medium with which the culture is mixed and this is shown at 38. A removable cover 40 is provided so that the culturing agent 38 can be replenished.

The float valve is adjusted so that the water level is carried at approximately the line indicated at 42. This is slightly above the perforated bottom 16 of the hopper so that the water can seep into the culturing agent 38.

Figure 2:
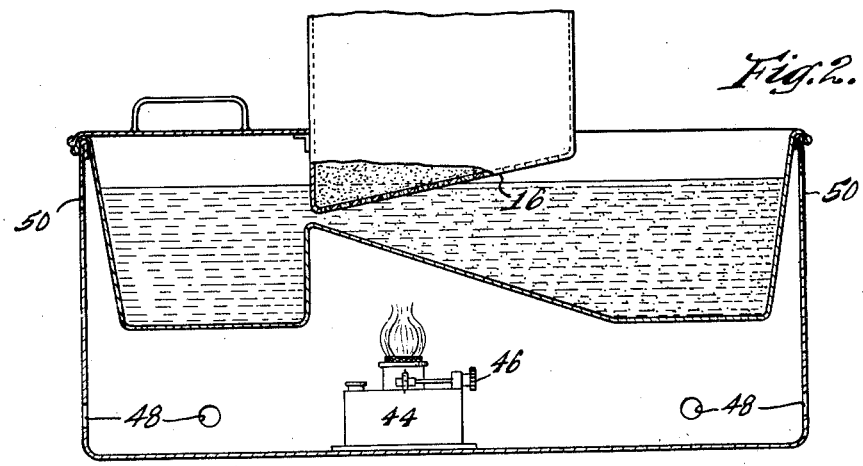
Figure 2 is a similar sectional view of a simpler form of the invention utilizing a kerosene burner where electricity is not available.

In Figure 2 I show a modification wherein instead of the heaters 26 and 26, a burner using kerosene or the like may be provided as at 44. The flame may be manually adjusted, the adjusting mechanism being capable of change by turning a knob 46. Suitable air inlet openings 48 and air outlet openings 50 are provided for ventilating the burner. The float valve has been omitted from Figure 2 but would be used, and the perforated bottom 16 it will be noted is arranged at a slant rather than straight as in Figure 1. This tends to slow down the passage of the culturing agent into the water.

*Practical Operation*

In the operation of my apparatus, the water provided in the trough T is warmed to a temperature between 65° and 100° depending upon what temperature is most efficient for the development of the culture in the culturing agent 38. By carrying the water level at 42 the warm water comes in contact with the perforated bottom 16 and by capillary action is drawn up into the culturing agent 38 to a distance of 3 or 4 inches. The temperature in this moistened layer would be somewhat lower than the temperature in the water and is preferably the optimum temperature range for good growth of the culture. Most cultures develop most efficiently at between 80° and 85° F. This temperature may be maintained approximately at all times by adjustment of the thermostat 36, an adjusting screw 37 being shown for this purpose.

As the animals drink from the trough portion 10, the water level becomes lower therein causing a sweep of water through the narrow gap indicated at 27 and this water sweeps across the lower moistened layer in the hopper H causing some of the culturing agent to be swept away and into the drinking water. The dry portion of the culturing agent slowly descends and becomes moistened in turn. In this warm moistened layer of culture agent intense biological activity is taking place. Much of the starches of the cereal is converted successively into dextrins, maltose and glucose. Some of these are consumed by the culturing agent in order to provide energy. At the same time lactic acid and other acids are generated which have nutritional value and also provide pH value of acidity which tends to discourage the growth of undesirable organisms and produce undesirable flavors. The pH range is approximately somewhere between 4.8 and 5.2.

Proteins of the grains are hydrolized to polypeptides units and eventually, in part at least, into amino acid units. These units are then assimilated by the culture into new protein characteristics of the culture. The quantity of this new protein increases as the culture multiplies. The quality of the new protein is high and is almost as good as animal protein. It is obvious that this process is very valuable when it can convert unbalanced plant protein into essentially balanced animal protein. Vitamins of the B complex family are developed with the growing material.

It may be pointed out here that this activity in the moistened layer proceeds for approximately 12 hours under optimum conditions. That is, it requires about this length of time for the moistened layer to descend and be completely replaced by new material.

It has been noted that the texture of the cellulose (fiber) is considerably altered during the culturing process. The resulting fiber is very soft and seems to be in a state of partial disintegration. Whether or not this condition indicates partial conversion of digestible carbohydrates, the fact remains that as roughage, it will better promote elimination and be less injurious from abrasive action to the intestines of the animal.

This process, then, is unique for several reasons:

(1) Animal feed is manufactured at the site of consumption.
(2) The feed so made has a fresh attractive flavor.
(3) Since there is no storage, no deterioration of vitamins can occur.
(4) Predigestion of starches into more easily digested maltose and glucose takes place.
(5) Poor quality cereal protein is converted into high quality protein (better balance of amino acids).
(6) Partial disintegration of fiber occurs.

During the culturing process, as soon as the culturing agent gets into the water of the trough T, the culture begins multiplying and traveling throughout every portion of the drinking trough. The animals in drinking from the trough are assured a constant supply of live, growing cultures to help aid digestion and assist in keeping the digestive system of the animal functioning for maximum growth and gain at low cost.

At the same time the process is performed by a relatively inexpensive and automatically operable apparatus. The apparatus is so designed that daily replenishment of the culturing agent 38 is all that is required for a reasonable number of animals with a cleaning out of the trough about once a week. When once the thermostat 36 is properly adjusted at installation, the apparatus will continue to perform satisfactorily for long periods of time.

It is generally agreed by nutritionists that livestock or poultry do not do well on a diet consisting of one grain alone. This same single grain when fed along with cultured water in accordance with my process, has been shown to grow and develop both livestock and poultry at a favorable rate of gain and at low cost. The microorganisms in the culturing agent help to break down starches and proteins found in grain and to convert them into more easily assimilated feed elements. The high quality protein produced by my process provides a superior feeding supplement to home-grown feeds than would the addition of skim milk which is deficient in iron, vitamins A and D and certain other essential bone, blood and body builders. By selecting the proper culture it is therefore possible to greatly improve the feeding of livestock and poultry with my process. I have also found that the water is apparently much more palatable to the animals and they accordingly drink more water and this, of course, is also advantageous.

Some changes may be made in the construction and arrangement of the parts of my apparatus and the method may be modified to some extent without departing from the real spirit and purpose of my invention. Accordingly, it is my intention to cover by my claims any modified forms of apparatus use of mechanical equivalents and mechanically equivalent methods which may be reasonably included within their scope.

What I claim as my invention and desire to secure by Letters Patent of the United States is:

1. In a drinking water trough structure, a drinking trough, means for maintaining water at a predetermined level therein, the bottom of said trough having a sloping portion, a hopper having a perforated bottom in said trough above the upper end of said sloping portion and slightly below said level of the water, said trough having a restricted water entrance passageway between said sloping portion and said hopper bottom, said hopper bottom being inclined with respect to said sloping portion of said trough bottom.

2. A drinking water apparatus comprising a trough, means for maintaining water at a predetermined level therein, said trough having a bottom provided with a sloping portion, and a hopper for granular material having a perforated bottom in said trough above said sloping bottom portion and slightly below said level of the water, said trough having a restricted water entrance passageway between the high end of said sloping bottom portion and said hopper bottom.

FRED K. CHANDLER.

REFERENCES CITED

The following references are of record in the file of this patent:

UNITED STATES PATENTS

| Number | Name | Date |
|---|---|---|
| 163,233 | Noland et al. | May 11, 1875 |
| 294,932 | Tappeiner | Mar. 11, 1884 |
| 429,384 | Manwaring | June 3, 1890 |
| 513,561 | Dodder | Jan. 30, 1894 |
| 576,777 | Eitemiller | Feb. 9, 1897 |
| 645,206 | Jones | Mar. 13, 1900 |
| 653,355 | Magie | July 10, 1900 |
| 1,651,725 | Myers | Dec. 6, 1927 |
| 1,693,611 | Mabee | Dec. 4, 1928 |
| 1,806,585 | Brown | May 26, 1931 |
| 2,068,981 | Hanny | Jan. 26, 1937 |
| 2,111,190 | McGuire | Mar. 15, 1938 |
| 2,205,898 | Chandler | June 25, 1940 |
| 2,234,041 | Chandler | Mar. 4, 1941 |

FOREIGN PATENTS

| Number | Country | Date |
|---|---|---|
| 810,440 | France | Mar. 22, 1937 |